United States Patent [19]

Reilly et al.

[11] Patent Number: 4,826,417

[45] Date of Patent: May 2, 1989

[54] APPARATUS FOR MAKING MOLDED WINDOW GASKET ASSEMBLY

[75] Inventors: Albert F. Reilly, Howell; John L. Sanok, Grosse Ile, both of Mich.

[73] Assignee: Sheller Globe Corporation, Toledo, Ohio

[21] Appl. No.: 942,507

[22] Filed: Dec. 16, 1986

Related U.S. Application Data

[62] Division of Ser. No. 505,196, Jun. 17, 1983, Pat. No. 4,648,832.

[51] Int. Cl.⁴ .................. B29C 33/12; B29C 45/14
[52] U.S. Cl. ................................. 425/116; 249/85; 425/127; 425/129.1; 425/542
[58] Field of Search .................. 249/85, 116, 127; 425/116, 127, 817 R, 542, 129.1

[56] References Cited

U.S. PATENT DOCUMENTS

| | | |
|---|---|---|
| 1,637,697 | 8/1927 | Jacobsen . |
| 1,911,578 | 5/1933 | Masters . |
| 2,025,198 | 12/1935 | Conrow . |
| 2,258,724 | 10/1941 | Wagner et al. . |
| 2,266,235 | 12/1941 | Mollard . |
| 2,342,758 | 2/1944 | Saunders et al. . |
| 2,576,392 | 11/1951 | Downes . |
| 2,645,827 | 7/1953 | Koll . |
| 2,701,041 | 2/1955 | Toth . |
| 2,718,664 | 9/1955 | Schweitzer . |
| 2,966,435 | 12/1960 | Kassinger . |
| 2,974,407 | 3/1961 | Barr . |
| 3,119,704 | 1/1964 | Harrell et al. . |
| 3,166,795 | 1/1965 | Joffe . |
| 3,263,014 | 7/1966 | Deisenroth ..................... 425/127 |
| 3,381,340 | 5/1968 | Chapin, Jr. . |
| 3,387,075 | 6/1968 | Wilcox . |

(List continued on next page.)

FOREIGN PATENT DOCUMENTS

| | | |
|---|---|---|
| 1123201 | 5/1982 | Canada . |
| 1141130 | 2/1983 | Canada . |
| 0076924 | 7/1984 | European Pat. Off. . |
| 1509278 | 7/1970 | Fed. Rep. of Germany . |
| 2062981 | 7/1971 | Fed. Rep. of Germany . |
| 2117523 | 10/1972 | Fed. Rep. of Germany . |
| 2544749 | 4/1977 | Fed. Rep. of Germany . |
| 2855050 | 7/1979 | Fed. Rep. of Germany . |
| 1374552 | 5/1964 | France . |
| 2157189 | 9/1973 | France . |
| 2204497 | 1/1974 | France . |

(List continued on next page.)

OTHER PUBLICATIONS

Bulletin 395—WITCO FOMREZ UL-28, "High-Performance Organotin Catalyst", Witco Chemical Organics Division—Jan. 1980.

(List continued on next page.)

Primary Examiner—Willard E. Hoag
Attorney, Agent, or Firm—Harness, Dickey & Pierce

[57] ABSTRACT

An improved window gasket assembly and the apparatus and associated method for reaction injection molding such assemblies, as well as other molded articles, are disclosed. The gasket is preferably integrally molded from an elastomeric material such as urethane onto a substantially transparent window panel. The gasket and window assembly can then be mounted and secured directly to a vehicle body panel opening, for example, with adhesives, thereby eliminating the need for discrete mechanical fasteners. In a preferred embodiment of the invention, an improved aftermixer and gating apparatus includes a mixing body in which a flowable multi-constituent molding material is separated into a number of generally serpentine mixing passageways and reunited in a common mixing cavity before being conveyed through a fan-gate passageway to the mold cavity. Adjustment means is provided for selectively altering the size of the mixing cavity and its inlet openings in order to selectively alter the back-pressure exerted on the material flowing therethrough, thereby enhancing the mixing of the molding material constituents. An improved mold apparatus is also preferably employed and includes elongated elastomeric members along the preferable edge of the mold cavity for supportingly engaging the mold members and substantially minimizing or preventing flashing of the molding material therefrom.

2 Claims, 2 Drawing Sheets

U.S. PATENT DOCUMENTS

| | | |
|---|---|---|
| 3,430,333 | 3/1969 | Hogden . |
| 3,440,121 | 4/1969 | Shockey . |
| 3,450,022 | 6/1969 | Engel . |
| 3,459,407 | 8/1969 | Hazlehurst et al. . |
| 3,470,912 | 10/1969 | Bydal . |
| 3,523,994 | 8/1970 | Shockey ............................. 264/252 |
| 3,659,896 | 5/1972 | Smith et al. ........................ 296/93 |
| 3,671,370 | 6/1972 | Littell, Jr. .............................. 52/397 |
| 3,719,222 | 3/1973 | Harding et al. . |
| 3,744,201 | 7/1973 | Dochnahl . |
| 3,759,004 | 9/1973 | Kent . |
| 3,776,591 | 12/1973 | Krueger . |
| 3,843,982 | 10/1974 | Lane . |
| 3,851,432 | 12/1974 | Griffin . |
| 3,884,007 | 5/1975 | Thoman . |
| 3,913,892 | 10/1975 | Ersfeld et al. . |
| 3,917,792 | 11/1975 | Conacher, Jr. ...................... 264/328 |
| 3,924,989 | 12/1975 | Althausen et al. .................. 425/130 |
| 3,941,355 | 3/1976 | Simpson ............................. 222/145 |
| 3,952,991 | 4/1976 | Schneider . |
| 3,968,612 | 7/1976 | Endo et al. . |
| 3,984,510 | 10/1976 | Chandra et al. .................... 264/40.1 |
| 4,007,536 | 2/1977 | Soderberg ......................... 29/421 R |
| 4,072,340 | 2/1978 | Morgan ............................. 296/84 R |
| 4,072,673 | 2/1978 | Lammers ............................ 264/225 |
| 4,097,928 | 6/1978 | Fries ................................... 425/24 R |
| 4,135,180 | 1/1979 | White ................................. 366/336 |
| 4,139,234 | 2/1979 | Morgan ............................. 296/84 R |
| 4,155,969 | 5/1979 | Hendry ............................... 264/45.1 |
| 4,190,711 | 2/1980 | Zdrahala et al. ................... 264/329 |
| 4,255,367 | 3/1981 | Wallace et al. .................... 264/45.1 |
| 4,265,965 | 5/1981 | Chancler ............................ 264/321 |
| 4,284,673 | 8/1981 | Ockels ................................ 264/46.4 |
| 4,284,679 | 8/1981 | Blad et al. ......................... 264/259 |
| 4,336,009 | 6/1982 | Wolf ................................... 425/116 |
| 4,340,311 | 7/1982 | Crandal .............................. 366/336 |
| 4,359,443 | 11/1982 | Michaels ............................. 249/160 |
| 4,361,407 | 11/1982 | Pellegrini ........................... 366/340 |
| 4,363,191 | 12/1982 | Morgan ............................... 49/381 |
| 4,364,214 | 12/1982 | Morgan ............................... 52/311 |
| 4,364,595 | 12/1982 | Morgan et al. .................... 296/84 R |
| 4,409,758 | 10/1983 | Dickerson et al. .................. 49/463 |
| 4,470,785 | 9/1984 | Koorevaar ......................... 425/116 |
| 4,561,625 | 12/1985 | Weaver ............................... 425/116 |
| 4,584,155 | 4/1986 | Zanella .............................. 425/117 |

FOREIGN PATENT DOCUMENTS

| | | |
|---|---|---|
| 2266582 | 8/1975 | France . |
| 2393663 | 3/1978 | France . |
| 56-154025 | 11/1981 | Japan . |
| 57-158481 | 9/1982 | Japan . |
| WO85/01468 | 4/1985 | PCT Int'l Appl. . |
| 695257 | 8/1953 | United Kingdom . |
| 961021 | 6/1964 | United Kingdom . |
| 1065958 | 4/1967 | United Kingdom . |
| 1327390 | 8/1973 | United Kingdom . |
| 1432333 | 4/1976 | United Kingdom . |
| 1478714 | 7/1977 | United Kingdom . |
| 1523547 | 9/1978 | United Kingdom . |
| 2049542 | 12/1980 | United Kingdom . |
| 2057338A | 4/1981 | United Kingdom . |
| 2079667A | 1/1982 | United Kingdom . |
| 2115049A | 9/1983 | United Kingdom . |
| 2115739A | 9/1983 | United Kingdom . |
| 2141375A | 12/1984 | United Kingdom . |
| 2147244A | 5/1985 | United Kingdom . |

OTHER PUBLICATIONS

Technical Information—ISONATE 181—The Upjohn Company.

Technical Information—ISONATE 191—The Upjohn Company.

Technical Information—ISONATE 143L—The Upjohn Company.

Technical Information—ISONATE 240—The Upjohn Company.

Urethane Chemicals Bulletin—Thanol SF-6503 POLYOL—Texaco Chemical Company.

Mondur PF—Modified Polyisocyanate Product Code: C-261—Mobay Chemical Corporation.

Mondur CD—Polyisocyanate Product Code: C-90-5—Mobay Chemical Corporation.

Bayer Polyurethanes, Bayer Chemical Co., W. Germany, circa. 1979, (Ed. #1.79E35-7109/847991), pp. 130–139.

Money Making Ideas—Module Slashes Cost, Weight of Automobile Quarter-Window, 72/Design News/-11-3-80, (2 Sheets).

"RIM Emerges as a Major Process"—Modern Plastics, Aug. 1979.

Release Agents from Contour.

Material Safety Data Sheet—DABCO 33-LV—Air Products & Chemicals, Inc.

Technical Bulletin—PRC 789, "Mold Release Agent for Rim/Microcellular Urethanes—Low Mold Temperatures"—Park Chemical Company.

(List continued on next page.)

OTHER PUBLICATIONS

Chemical Coatings—Polane T. Green, (Modified), SA8060-G64—Sherwin Williams Company—May 1981.

Formula Selection—FREKOTE: The Unconditional Release—Frekote, Inc.

Wirtz, H. "Progress in Rim Technology for Automobile Components", in Plastic and Rubber Processing, Dec. 1979, pp. 167–170.

Plastics Engineering, "The Story Behind Liquid Injection Molding of Polyurethanes" by French Conway Ass. Editor—1/1975, pp. 25–29.

Emmerich, Anthony, "Liquid Injection Molding: Where It Stands Today" in Plastics Technology, Apr. 1980, pp. 91–96.

Becker, Walter E. et al., "Reaction Injection Molding", New York, Van Nostrand Reinhold Co., ©1979—pp. 59–60, 78–86, 215–235.

"Glass Bonding With Polyurethane"—ATZ Automobiltechnische Zeitschrift 85, (1983)—p. 678.

APPARATUS FOR MAKING MOLDED WINDOW GASKET ASSEMBLY

This is a division of U.S. patent application Ser. No. 505,196, filed June 17, 1983, now U.S. Pat. No. 4,648,832 entitled MOLDED WINDOW GASKET ASSEMBLY AND APPARATUS AND METHOD FOR MAKING SAME.

BACKGROUND AND SUMMARY OF THE INVENTION

The invention relates generally to molded window gaskets and to the reaction injection molding of such articles from a multi-constituent material in a mold cavity. More particularly, the invention relates to such gaskets for automotive applications and to equipment and methods of reaction injection molding of such articles, wherein the elastomeric window gaskets are integrally molded onto a window panel of glass or other transparent material.

It has been known in the past to fabricate articles such as modular window gaskets for vehicular installations from materials such as polyvinylchloride (PVC) using conventional compression or injection molding techniques. Some of such window gaskets have been injection molded directly onto the window panel, which is made of glass or other subsantially transparent material. The window and gasket assemblies have then been installed in a vehicle or other window frame with adhesives and/or with integrally molded fastener protrusions, as disclosed, for example, in U.S. Pat. Nos. 4,072,340 and 4,139,234. It has been found, however, that window panel breakage has been unacceptably high in such prior processes because of the high pressures required in the injection molding processes and because of the hardness and rigidity of the mold structures involved. Additionally, because of the types of materials previously used in molding the gaskets, such as rubber or polyvinylchloride (PVC), it has been found that proper adhesion of such gaskets to metal body panels and to glass window panels has been difficult to attain, thereby resulting in water leaks, wind noise, and other related problems, as well as requiring the use of mechanical fasteners to secure the assemblies to the body panels.

In accordance with the present invention, improved apparatuses and methods of reaction injection molding articles such as vehicular window gaskets are provided in order to overcome the above-discussed disadvantages. Such methods and apparatus allow window gaskets to be reaction injection molded from multi-constituent liquid materials, such as urethane, for example, and to be molded at relatively low pressures directly onto the glass or other transparent window panels. The gasket and window panel assemblies can then be mounted directly into a window opening in a body panel and secured thereto with adhesives without the need for mechanical fastener devices, thereby simplifying the installation process and making it better suited for robotic or other automated equipment. All or a portion of the gasket can also be coated with a pigment decorative material in the mold cavity if desired.

The gaskets according to the present invention may also be fabricated with a lower cross-sectional profile, thereby providing for a smooth aerodynamically advantageous fit between the window assembly and the body panel. Such lower profile also requires less offset or other forming of the body panel area surrounding the window opening, thus simplifying the body panel fabrication and increasing the design flexibility for such body panels. Also, because the gasket and window assembly is preferably bonded and secured to the body panel substantially continuously around the window opening periphery, the localized stress concentrations caused by spaced, discrete mechanical fasteners are substantially avoided and the bonding and securing forces are more evenly distributed. This allows the window panel to effectively contribute to the structural integrity of the installation, and also to allow for a reduction in window panel thickness and weight.

In a preferred embodiment of the present invention, an aftermixer apparatus for use in a reaction injection molding system includes a mixing body having at least one common inlet passageway for receiving a multi-constituent material in a pressurized flowable state. The apparatus includes a number of mixing passageways adapted to receive the material from the common inlet passageway and separate it into a corresponding number of material flow streams. A common mixing cavity in fluid communication with the mixing passageways reunites the separated flow streams and conveys the material into a gating device for introduction into the mold cavity. Adjustment means is provided for selectively altering the size of the common mixing cavity and the size of its inlets in order to selectively alter the back-pressure exerted on the material flowing therethrough. Such adjustment feature allows for the optimization of the back-pressure and thus the intermixing of the constituents of the material for a given flow rate and inlet pressure thereof. Preferably, the mixing passageways each extend along a generally sepentine path including at least one bight portion adapted to cause the material flowing therethrough to substantially reverse its direction of flow in order to increase turbulence and enhance the mixing of the material constituents.

At least a portion of the preferred mold cavity of the reaction injection molding system includes one or more elongated elastomeric members positioned generally adjacent the peripheral edge of the mold cavity for supportingly engaging the mold members and the window panel. The flexible elongated elastomeric members are preferably seated in grooves in one or the other of the mold members and are further adapted to substantially minimize or prevent flashing of the gasket material out of the mold cavity and also serve to accommodate variations in the shape of the window panels.

Additional objects, advantages and features of the present invention will become apparent from the following description and appended claims, taken in conjunction with the accompanying drawings.

DETAILED DESCRIPTION OF THE PREFERRED EMBODIMENTS

Figure 1:
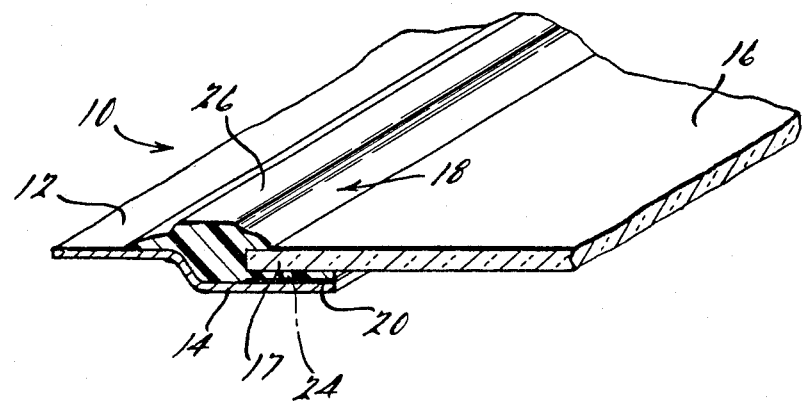
FIG. 1 illustrates a portion of an exemplary vehicular window assembly, partially in cross-section, having a window gasket member integrally molded onto a transparent window panel in accordance with the present invention.

In FIGS. 1 through 5, exemplary embodiments of the present invention are illustrated for the reaction injection molding of integrally-molded vehicular window panel gaskets onto their associated glass or other transparent window panels. One skilled in the art will readily recognize from the following discussion, however, that the principles of the invention are equally applicable to reaction injection molding of items other than vehicular window gaskets, as well as being applicable to apparatus other than the reaction injection molding system shown in the drawings.

In FIG. 1, a vehicular window assembly 10 generally includes a vehicle body or other panel 12 having a recessed portion 14 surrounding an opening for receiving a substantially transparent window panel therein. In the exemplary window assembly 10 illustrated in FIG. 1, a transparent window panel 16, which is preferably glass, has a window gasket member 18 integrally molded thereon, with an edge portion 17 of the window panel substantially embedded in the gasket member 18. The gasket and window panel assembly is secured to the recessed portion 14 by means of an adhesive material 20 without the need for mechanical fasteners protruding through apertures in the body panel. By eliminating the need for such fasteners, the cross-sectional profile of the gasket member 18 may be minimized in order to provide a smooth relatively unobtrusive fit with the body panel 12, thereby reducing the aerodynamic drag on the vehicle. Also, because the gasket member and window panel assembly is secured and bonded substantially continuously around its periphery, the window panel effectively becomes part of the body structure and is not subjected to the localized stress concentrations caused by discrete mechanical fasteners. Thus the window panel 16 can be thinner and lighter in weight than those previously used. Optionally, however, if direct bonding between the body panel 12 and the window panel 16 is desired, the window gasket member 18 may optionally be formed with a channel-shaped opening 24 extending therethrough in order to allow a suitable adhesive to bond the window panel 16 directly to the recessed portion 14. Such optional channel-shaped opening 24 may consist of either a single opening extending continuously throughout the entire window gasket member 18, or a series of discrete channel-shaped openings at spaced locations throughout the window gasket member.

As will become apparent from the discussion below, the window gasket member 18 may also optionally include a coating of pigmented material either on its entire exterior surface, or on a predetermined portion thereof, as illustrated by reference numeral 26. Such coating of pigmented material can be applied to the window gasket member 18 during the molding process in order to provide a decorative stripe on its exterior surface, or to color the window gasket member in order to complement the color scheme of the vehicle.

The window gasket member 18 is preferably molded from a multi-constituent material, such as liquid urethane matereial for example. Such urethane material may be composed, for example, of a polyol resin constituent, an isocyanate constituent, and a catalyst. Examples of commercially-available polyol resins are manufactured by The Dow Chemical Company under the trademark VORANOL and by Texaco Chemical Company under the trademark THANOL SF-6503. Examples of commercial isocyanates are produced by The Upjohn Company under the trademarks ISONATE 143L, ISONATE 181, ISONATE 191 and ISONATE 240, and also by Mobay Chemical Corporation under the trademarks MONDUR PF and MONDUR CD. An example of a suitable catalyst for such urethane material is marketed by Witco Chemical Company under the trademark WITCO FOMREZ UL-28.

Figure 2:
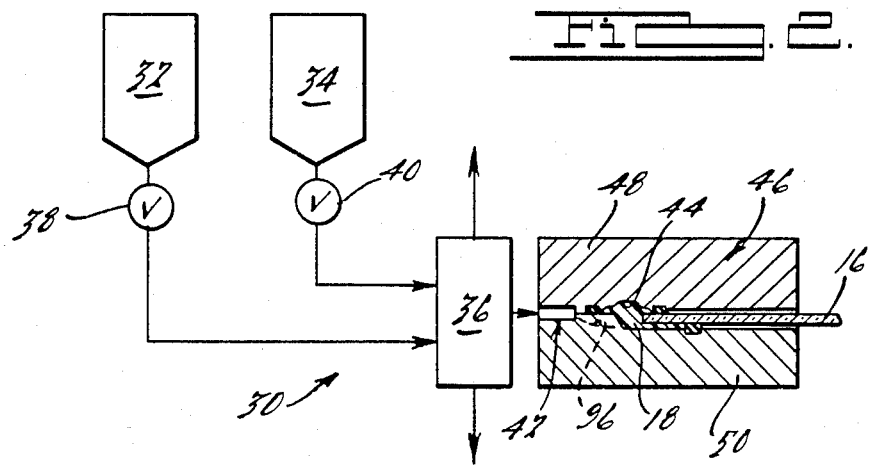
FIG. 2 is a schematic diagram illustrating a reaction injection molding system for fabricating the gasket and window panel assembly of FIG. 1.

As illustrated schematically by the reaction injection molding system 30 in FIG. 2, the constituents of window gasket material are injected from two or more constituent sources 32 and 34 into a high-pressure mixing apparatus 36 by way of the respective metering devices 38 and 40. The constituents of the material are mixed in the high-pressure mixing apparatus 36 at pressures in the range of approximateely 2000 p.s.i.g. to approximately 3000 p.s.i.g. and are conveyed to an aftermixer and gating apparatus 42. As discussed below, the aftermixer and gating apparatus 42 further mixed the constituents of the gasket material and reduces its pressure to a range of approximately 30 p.s.i.g. to approximately 100 p.s.i.g., and preferably approximately 50 p.s.i.g., before introducing the material into a mold cavity 44 of a mold apparatus 46.

Prior to the injection of the multi-constituent gasket material into the mold apparatus 46, the mold cavity is preferably coated with any of a number of known mold release agents, which typically consist of low-melting point waxes or silicon oils, for example. Commercial examples of mold release agents are produced by Contour Chemical Company under the tradmark KRAXO 1711, EXITT II, TRULEASE 125, LIFFT and NON-STICKENSTOFFE, by Frekote Inc. under the trademarks FREKOTE 34, FREKOTE 34H, FREKOTE 31, and FREKOE 31H, and by Park Chemical Company under the trademark PRC789. The volatile mold release agent is then allowed to at least partially flash off of the mold apparatus which is typically at a temperature in the range of approximately 110° F. to approximately 160° F.

If desired, all of the mold cavity surface, or a predetermined portion thereof, may be coated with a pigmented material so that the pigmented material will be transferred in the mold to the desired surface or surfaces of the gasket or other molded article during the reaction injection molding process. An example of such pigmented material coating is manufactured by Sherwin Williams Company under the trademark POLANE. After the pigmented material coating has been allowed to flash off, the window panel 16 is positioned in the mold and the mold members 48 and 50 of the mold apparatus 46 are closed, substantially in mutual engagement with one another. The constituents of the gasket material are injected into the system, mixed and introduced into the mold cavity 44 as described above, and the window panel 16 with the window gasket 18 integrally molded thereon is then removed.

As is known to those skilled in the reaction injection molding art, the intermixed constituents of the molding material undergo a rapid and highly exothermic reaction in the mold cavity and are approximately 70% cured within a very short time, generally less than one to six minutes, depending upon the catalyst employed. After such time, the molded article may be removed from the molding apparatus and allowed to cool at ambient temperatures.

Figure 3:
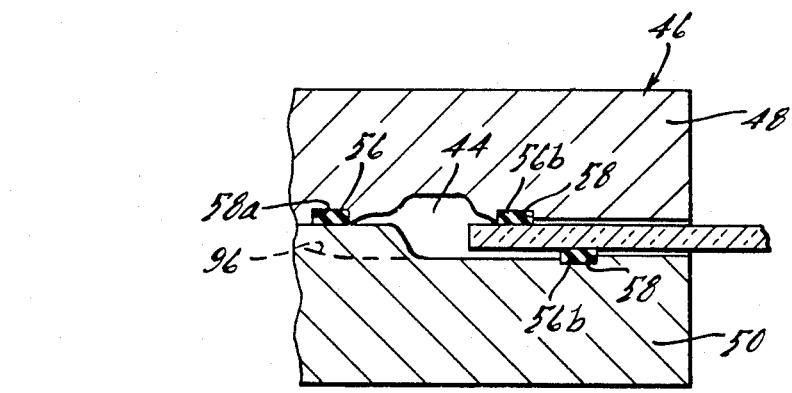
FIG. 3 is a partial cross-sectional view of a mold apparatus for the molding system illustrated in FIG. 2.

As illustrated in FIG. 3, at least one, and preferably both, of the mold members 48 and 50 include an elongated outer elastomeric bead member 56a and an inner bead member 56(b) compressingly seated within corresponding grooves 58. The grooves 58 are positioned generally adjacent the peripheral edges of the mold cavity 44 so that the elastomeric members 56 compressingly engage and sealingly support either the opposite mold member or the window panel 16 and also substantially prevent or minimize flashing of the molding material out from the mold cavity 44. When the mold apparatus is open, the elastomeric members 56 preferably protrude slightly from their associated grooves 58 (protrude from the mold surface) so that the force required to hold the mold members 48 and 50 together in a sealing engagement is substantially reduced from the force that would be necessary if the mold members were required to be forced into direct contact with one another. Similarly, a significantly reduced pressure is exerted on the window panel 16 and consequently the frequency of breakage of the window panels is substantially minimized or eliminated. Such reduction in the force required to hold the mold members together is also significantly less than that required in conventional compression and injection molding processes. Additionally, the elastomeric members 56 are sufficiently flexible to allow for minor variations in the shape and contour of the window panels and thereby sealingly isolate the mold cavity 44 regardless of such minor window panel variations.

Figure 4:
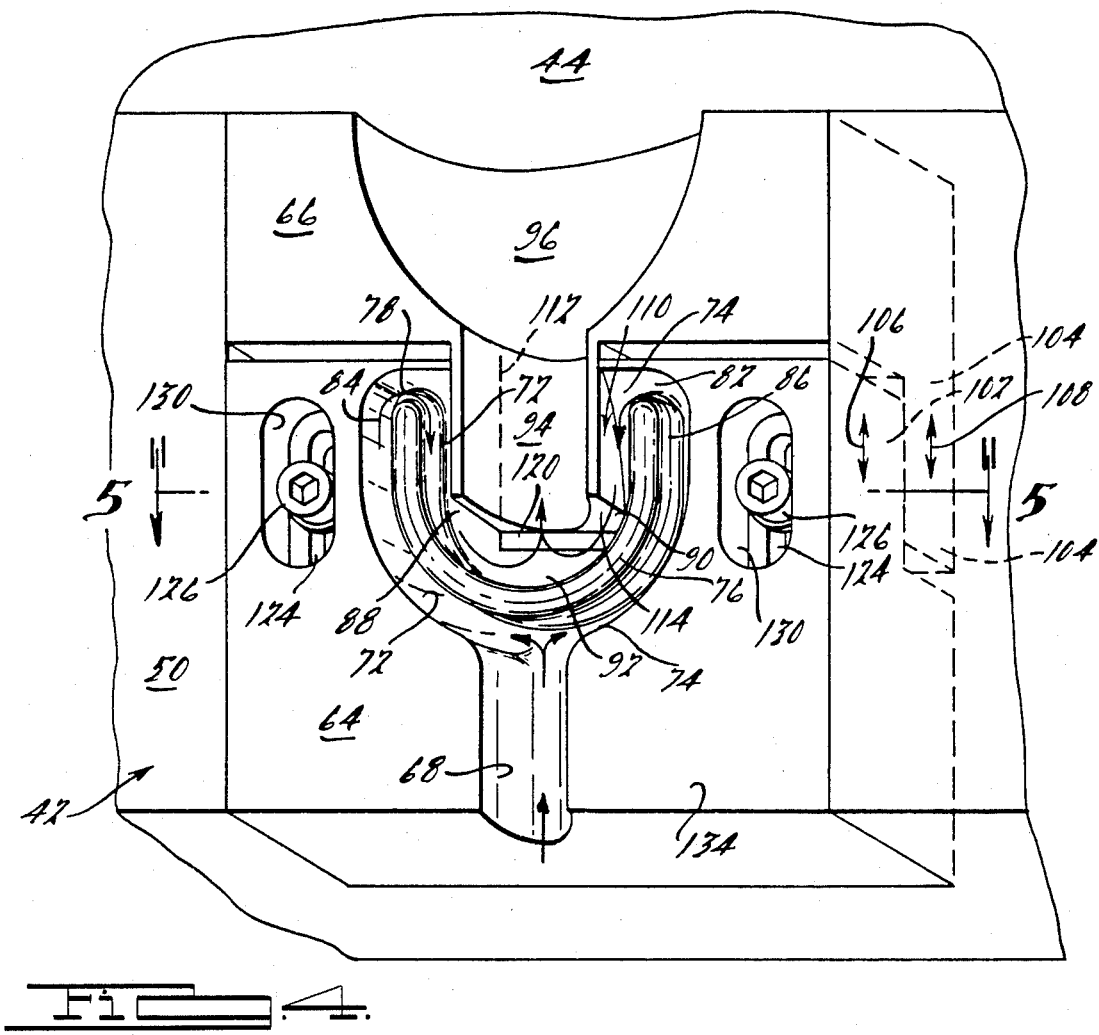
FIG. 4 is a perspective view of an aftermixer and gating apparatus for a reaction injection molding apparatus in accordance with the present invention.
Figure 5:
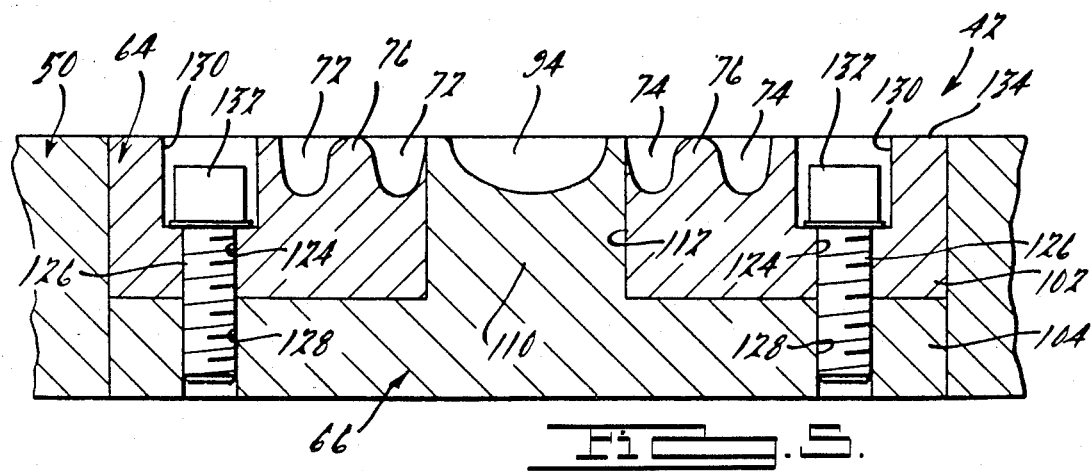
FIG. 5 is a cross-sectional view taken along line 5—5 of FIG. 4.

FIGS. 4 and 5 illustrate an improved aftermixer and gating apparatus 42, generally including an aftermixer block or body 64 and a gating block or body 66 position in one or the other of the mold members 48 or 50 for further mixing the constituents of the gasket material and admitting the material to the mold cavity 44.

The aftermixer body 64 includes at least one common inlet passageway 68 for receiving the gasket material from the high-pressure mixing apparatus 36 at a predetermined flow rate and pressure. The gasket material flows through the inlet passageway 68 into at least a pair of curvilinear mixing passageways 72 and 74 where it is separated into a corresponding number of flow streams. Such separation increases the turbulence of the gasket material flow and accordingly enhances the intermixing of its constituents. The mixing passageways 72 and 74 include a divider wall 76 therein, which form a generally serpentine path in the mixing passageways. Such serpentine path includes at least one bight portion 78 in the mixing passageway 72 and a similar bight portion 82 in the mixing passageway 74. Such bight portions cause the gasket material to substantially reverse its direction of flow, as indicated by the flow arrows 84 and 86, respectively, in order to increase the turbulence of each of the gasket material flow streams and enhance the intermixing of the constituents therein.

Once the gasket material flows through the mixing passageways 72 and 74, it enters a corresponding number of respective inlet openings 88 and 90 of at least one common mixing cavity 92. The flow streams from the mixing passageways are reunited in the mixing cavity 92, which again reverses the flow directions of the flow streams, increases their turbulence, and enhances the intermixing of the gasket material constituents. The reunited and intermixed gasket material from the mixing cavity is received by the inlet passageway 94 in the gating body, wherein it is conveyed through a diverging fan-gate passageway 96 to the mold cavity 44.

The aftermixer body 64 preferably includes a stepped or offset portion 102 adapted to slidingly engage a preferably corresponding stepped or offset portion 104 on the gating body 66, such that the aftermixer body 64 and the gating body 66 may be slidably and adjustably moved toward or away from one another as indicated by the arrows 106 and 108. The gating body 66 also includes an integrally-formed tongue portion 110 in which the gating inlet passageway 94 is formed. The tongue portion 110 is slidably received in a slot 112 in the aftermixer body 64 for slidable and adjustable movement therein as the aftermixer and gating bodies are adjustably moved as described above. The end portion 114 of the tongue portion 110 defines the exit portion of the mixing cavity 92 such that selective movement of the tongue portion 110 in the slot 112 allows the sizes of the mixing cavity 92 and its inlet openings 88 and 90 to be selectively altered as the aftermixer and gating bodies are selectively and adjustably moved. Thus the sizes of the mixing cavity and its inlet openings may be selectively and adjustably increased as the aftermixer and gating bodies are moved apart from one another, and correspondingly such sizes may be selectively and adjustably decreased as the aftermixer and gating bodies are moved toward one another. In order to fill the unoccupied gap in the slot 112 in the aftermixer body 64 after the aftermixer body has been adjustably moved away from the gating body 66, one or more shim members 120 are removably insertable into the slot adjacent the end portion 114 of the tongue 110.

The aftermixer body 64 is preferably provided with one or more elongated openings 124 therethrough for receiving a threaded fastener 126 extending therethrough. The threaded fastener is adapted to threadably engage a threaded aperture 128 in the gating body 66 and serves as a locking means for fixing a preselected position of the tongue portion 110 in the slot 112. Preferably, the aftermixer body 64 is also provided with countersunk portions 130 for allowing the head portions 132 of the fasteners 126 in a recessed relationship with the surface 134 of the aftermixer body 64.

The above-described selective adjustments to the size of the mixing cavity 92 and its inlet openings 94 and 96 allow for the selective alteration of the back-pressure exerted by the aftermixer and gating apparatus 42 on the gasket material flowing therethrough. Such alteration thereby allows for the selective optimization of the intermixing of the constituents of the gasket material for a predetermined flow rate and pressure of the material from the high-pressure mixing apparatus 36 shown schematically in FIG. 2. By such adjustments, therefore, the user of the reaction injection molding system may "fine-tune" the process to achieve optimum intermixing and reaction of the constituents of the molding material as well as achieving greater control over the pressure at which the molding material is introduced into the mold cavity.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A reaction injection molding apparatus for molding window gaskets or the like, from a multi-constituent urethane material in a laterally-extending mold cavity, said system comprising in combination:

a source of the constituents of said material in a pressurized flowable state;

means for receiving and intermixing said material constituents from said source and for conveying said intermixed multi-constituent material to said mold cavity at a predetermined pressure; and a mold apparatus including at least a first mold member and a second mold member mutually engageable with one another and defining said mold cavity therebetween, at least one of said mold members including at least one laterally outer flexible elastomeric member thereon generally adjacent an edge of said mold cavity and extending generally around the periphery thereof, said outer flexible elastomeric member supportingly engaging the other of said mold members and being adapted to substantially prevent flashing of said material out of said mold cavity, said mold cavity being adapted to receive a glass window panel inserted therein prior to the introduction of said multi-constituent material into said mold cavity, and said window panel being sealingly and removably supported between a pair of laterally inner flexible elastomeric members on said mold members during the introduction of said multi-constituent material into said mold cavity, said mold cavity being defined by said mold members, said outer and inner flexible elastomeric members, and said window panel, said inner flexible members each being engageable with one of said mold members and said window panel when the panel is inserted in said mold cavity and said outer flexible member being engageable with both of said mold members when said mold members are closed in mutual engagement with each other.

2. A reaction injection molding apparatus for molding a urethane window gasket member from a multi-constituent urethane material in a laterally-extending mold cavity, said apparatus comprising a source of said multi-constituent urethane material in an intermixed pressurized flowable state, a mold apparatus including a first mold member and a second mold member mutually engageable with one another and defining said mold cavity therebetween, at least a portion of said mold cavity being adapted to receive a portion of a substantially transparent glass window panel inserted in a laterally-extending orientation therein prior to the introduction of said material into said mold cavity, and means for securely molding and bonding said urethane window gasket member in place on an edge portion of said glass window panel within said mold cavity, said apparatus further including at least one laterally outer flexible elastomeric member between said mold members, and a pair of laterally inner flexible elastomeric members on said mold members on opposite sides of said window panel when inserted in said mold cavity, said inner flexibile members each being engageable with one of said mold members and said window panel when the panel is inserted in said mold cavity and said outer flexible member being engageable with both of said mold members when said mold members are closed in mutual engagement with each other.

* * * * *

UNITED STATES PATENT AND TRADEMARK OFFICE
CERTIFICATE OF CORRECTION

PATENT NO. : 4,826,417
DATED : May 2, 1989
INVENTOR(S) : Albert F. Reilly & John L. Sanok It is certified that error appears in the above-identified patent and that said Letters Patent is hereby corrected as shown below:

Column 3, line 65, "matereial" should be --material--.

Column 4, line 22, "approximateely" should be --approximately--.

Column 4, line 22, "mixed" should be --mixes--.

Column 5, line 38, "FREKOE 31H" should be --FREKOTE 31H--.

Column 8, line 24, claim 2, insert "said outer flexible elastomeric member extending generally adjacent the outboard periphery of said mold cavity," after --members--.

Column 8, line 27, claim 2, "flexibile" should be --flexible--.

Signed and Sealed this

Eighth Day of May, 1990

*Attest:*

HARRY F. MANBECK, JR.

*Attesting Officer*  *Commissioner of Patents and Trademarks*